United States Patent [19]

Le Cann et al.

[11] 4,450,953
[45] May 29, 1984

[54] HELICALLY GUIDED ENDLESS BELT CONVEYOR

[75] Inventors: Robert Le Cann; Jean-Paul Fache, both of Reze-les-Nantes, France

[73] Assignee: Frigofrance S.A., Bouguenais, France

[21] Appl. No.: 362,626

[22] Filed: Mar. 29, 1982

[30] Foreign Application Priority Data

Apr. 3, 1981 [FR] France .................. 81 06789

[51] Int. Cl.³ ........................................ B65G 15/00
[52] U.S. Cl. .................................................. 198/778
[58] Field of Search .................. 198/778; 134/132; 62/381, 63, 64, 373, 374, 375, 380, 381

[56] References Cited

U.S. PATENT DOCUMENTS

| | | | |
|---|---|---|---|
| 1,907,649 | 5/1933 | Marx | 62/380 |
| 2,093,270 | 9/1939 | Glinka | 198/778 |
| 3,133,798 | 5/1964 | Feld | 198/778 |
| 3,302,423 | 2/1967 | Morrison | 62/380 |
| 3,536,183 | 10/1970 | Locke | 198/778 |
| 3,774,524 | 11/1973 | Howard | 62/64 |
| 3,938,651 | 2/1976 | Alfred et al. | 198/778 |
| 4,023,381 | 5/1977 | Onodera | 198/778 |

FOREIGN PATENT DOCUMENTS

| | | |
|---|---|---|
| 684922 | 12/1939 | Fed. Rep. of Germany . |
| 698360 | 11/1940 | Fed. Rep. of Germany . |
| 2544916 | 12/1976 | Fed. Rep. of Germany . |
| 2063070 | 7/1971 | France . |
| 2220442 | 10/1974 | France . |

*Primary Examiner*—John W. Shepperd
*Attorney, Agent, or Firm*—Shenier & O'Connor

[57] ABSTRACT

The present invention relates to a helically guided endless belt conveyor constituted of a conveyor belt comprising on the inside struts to determine the pitch of the spires and on the outside members resting on helical guide means.

Said belt is provided on its inside edge with a series of fingers which are selectively engaged in vertical grooves of a central driving drum so as to guide the belt along an upward or downward helical course.

The invention finds an application in the production of helical conveyors.

10 Claims, 16 Drawing Figures

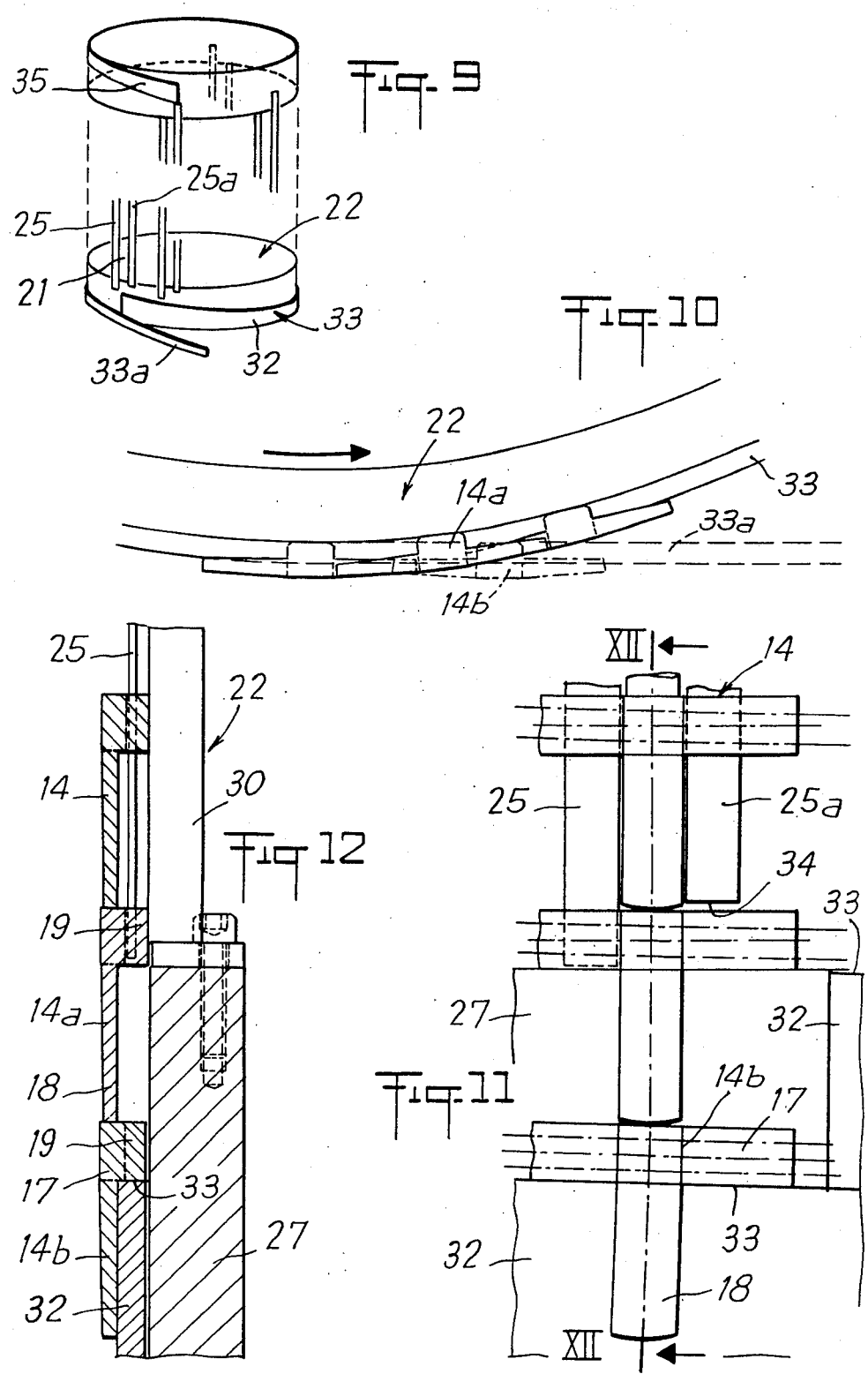

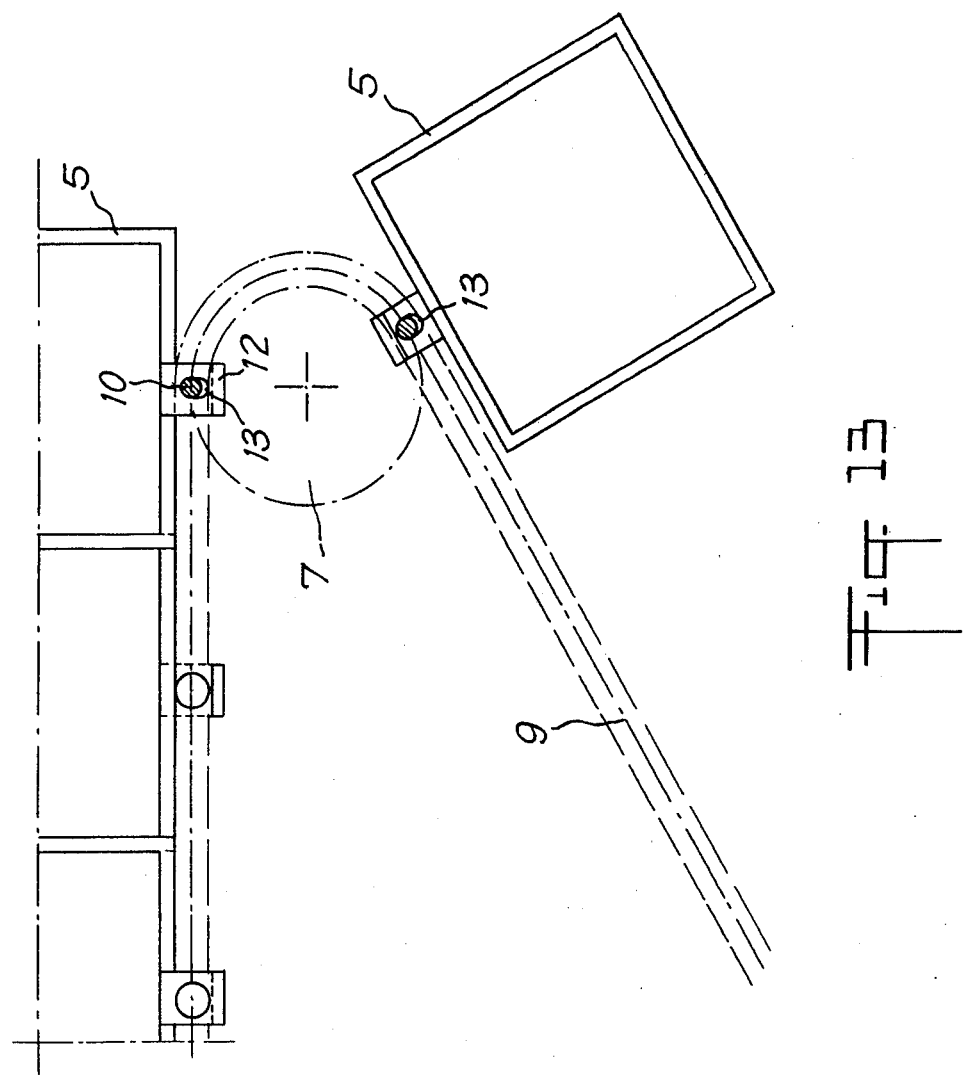

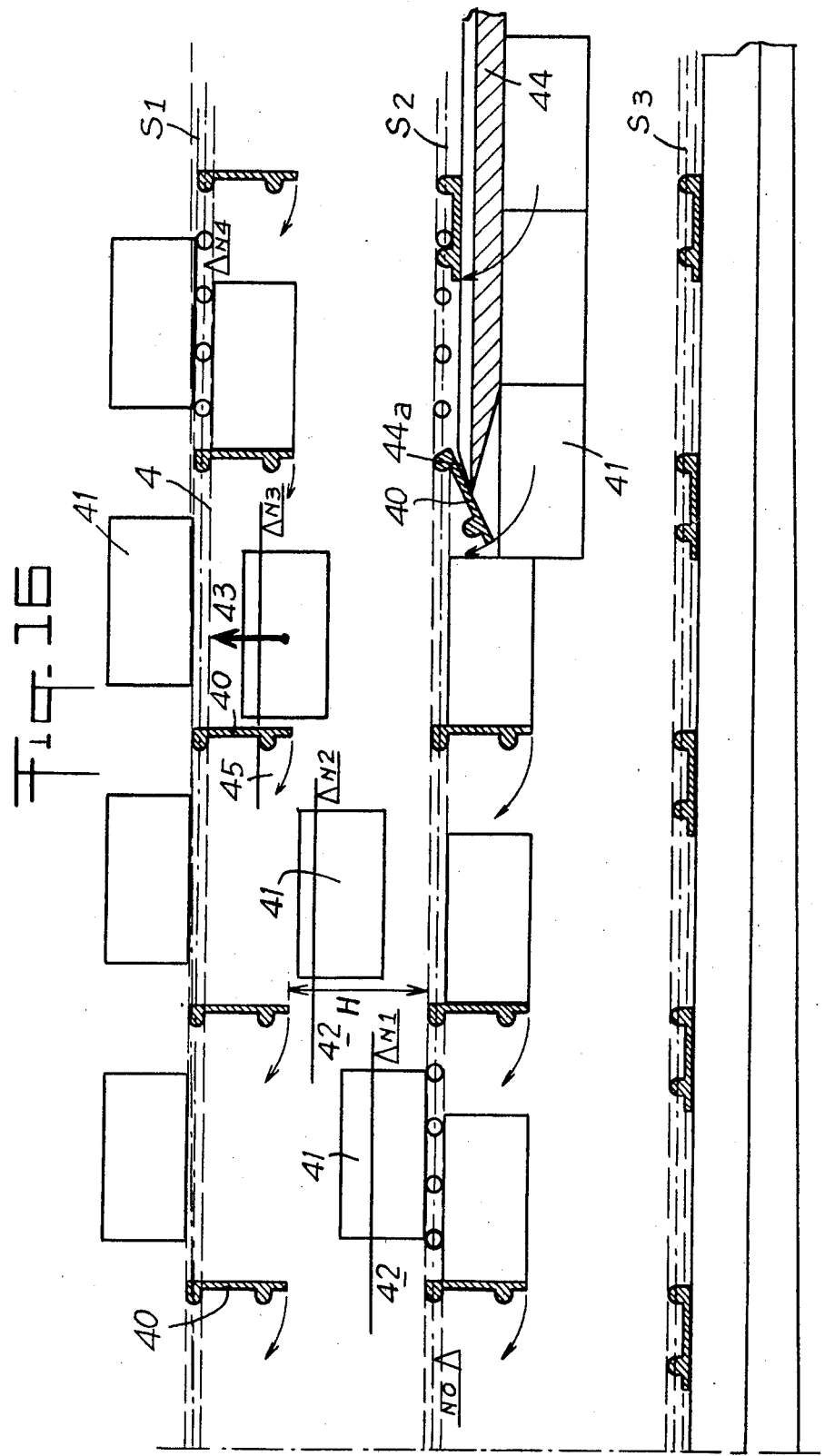

HELICALLY GUIDED ENDLESS BELT CONVEYOR

The present invention relates to an endless belt conveyor following a helical course.

It is known to use conveyors constituted by a helically guided endless belt for the transport of certain products during which the products are subjected to a special treatment.

For certain applications, however, the currently known devices are not really satisfactory or cannot be used because, precisely, of their configuration and of their driving method.

It is the object of the present invention to propose a simple device permitting to keep the products immersed in a liquid denser than they are.

The device according to the invention can be applied to transporting tightly-packed food products, in brines, in order to congeal them, according to the method described in French Pat. No. 77.10002.

According to another application of the invention, products conveyed continuously are subjected to a flow of cold air ensuring either the cooling, or congealing, as described in French Pat. No. 77.13975.

The device according to the invention comprises a belt provided on its inner edge with a succession of fingers which are selectively engaged in vertical grooves provided in a driving member so as to guide the belt along an upward or downward helical course. Said device permits due to cross-shaped struts to guide the endless belt along a helical course, whilst ensuring a free space on the inside between the spires of the belt, and its support where the belt comes on the drum and leaves it.

It is also possible with said device to simplify the drive by using a simple drum or capstan, driven in rotation by a driving member and to advantageously replace the usual pinion assemblies or the known friction driving means.

The invention will be more readily understood on reading the following description with reference to the accompanying drawings in which:

FIG. 9 is a perspective view of the drum and of the helical-shaped fixed support members;

FIG. 10 is a plan view of the struts leaving the drum or capstan;

FIG. 11 is an elevational view of the conveyor leaving the drum or capstan;

FIG. 12 is an elevational view of a cross-section along line XII-XII of FIG. 11.

FIG. 13 is an elevational view of a pinion or of a drum for guiding the conveyor and of the edge elements;

FIG. 16 is an elevational view of the stacking of several spires.

Figure 1:
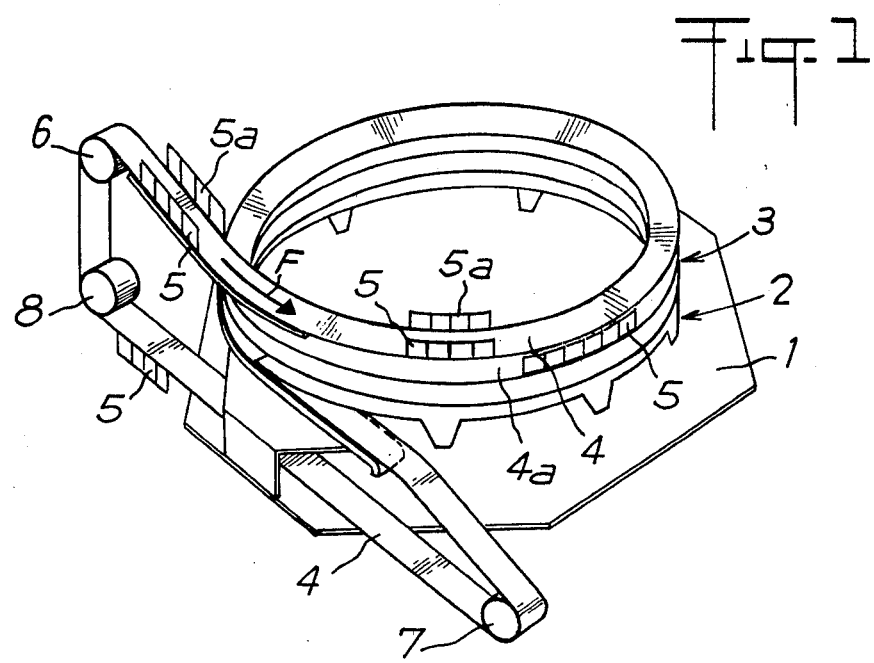
FIG. 1 is a perspective view of an embodiment of the conveyor according to the invention.

FIG. 1 shows an embodiment of the conveyor according to the invention which comprises a base-plate 1 on which is secured a lower frame 2 supporting a stack 3 constituted of an endless conveyor belt 4 guided along a helical course and comprising vertical edge elements 5, 5a.

The belt 4 is driven along arrow F and is guided out of the stack by pinions or drums 6, 7 and 8.

The tension of the belt is obtained in particular by means using a hydraulic jack which act on the return pinions or drums 6, 7 and using a control of the pressure of the fluid in the jack to ensure a constant pressure with a maximum safety value.

Figure 4:
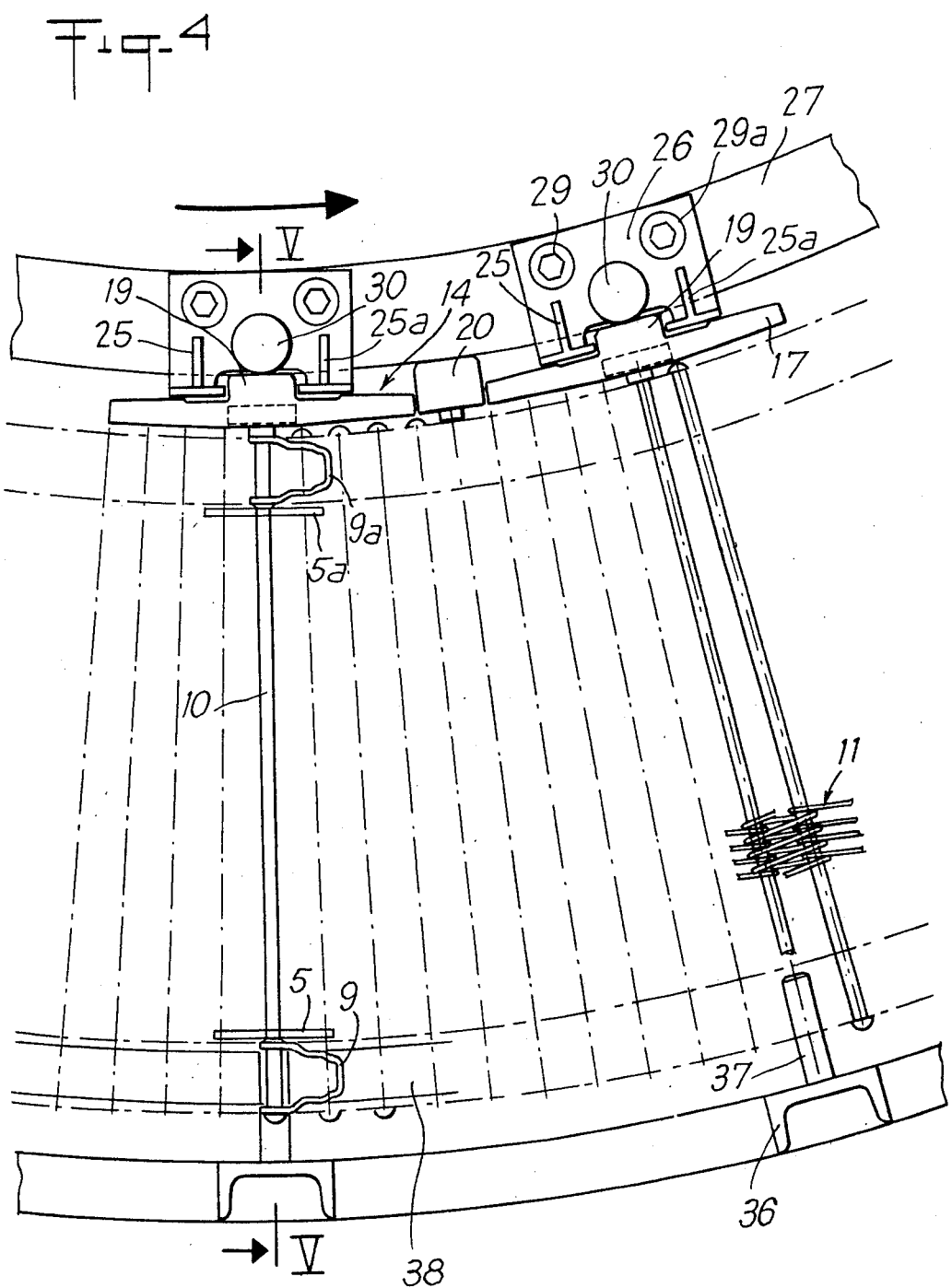
FIG. 4 is a plan view of the belt and of its driving means.

The belt 4 is constituted by two chains (FIGS. 4, 5, 13) 9, 9a connected together by rods 10 on which is fixed a belt or strip with articulated links 11. Edge elements 5, 5a are mounted on the rods 10 in overlapping manner, on each side of the belt, which edge elements are constituted by solid or latticed plates and comprise in their lower middle part, lugs 12 provided with oblong holes 13 in which are engaged the ends of the rods 10 (FIG. 13). Said oblong holes 13 are designed to allow the release of the supports of the edge elements 5, 5a when they pass over the pinions 6, 7 and 8.

Figure 7:
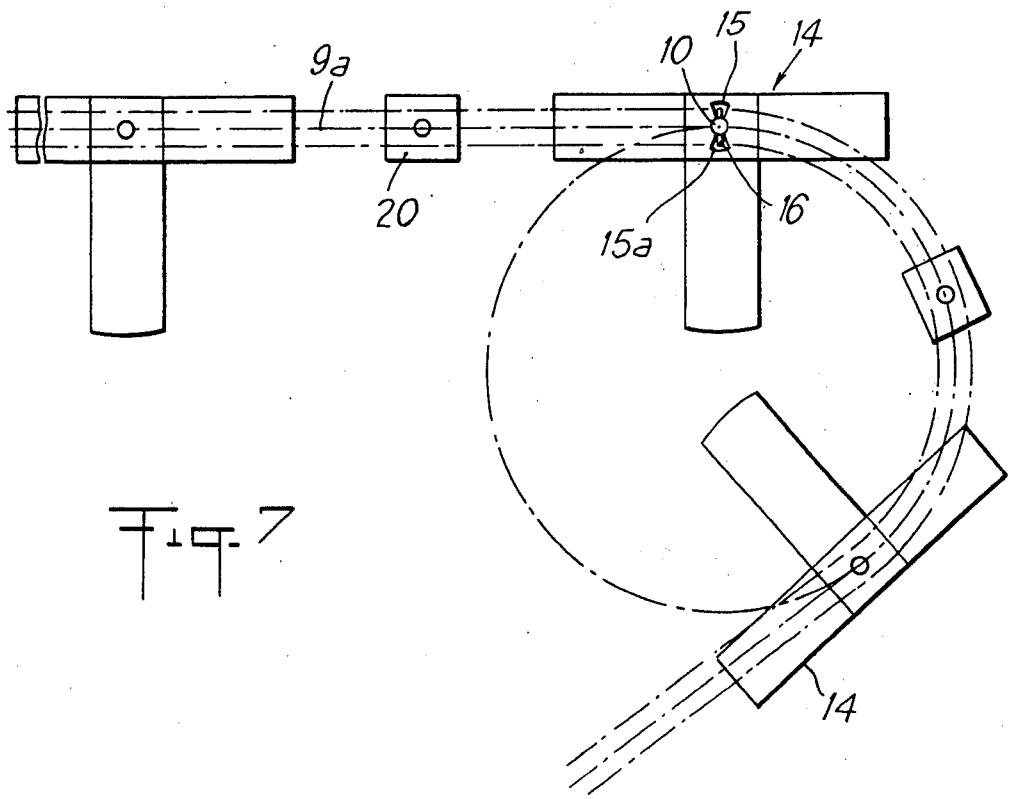
FIG. 7 is an elevational view of the drum and of the struts mounted on the chain of the conveyor.

Struts 14 are secured at the end of certain rods 10 situated on the inside of the spiral, said struts presenting openings 15, 15a in which a pin 16 is mounted, which pin is integral with the rod 10 and is used to limit the pivoting of the struts on the rods 10 (FIG. 7).

Figure 8:
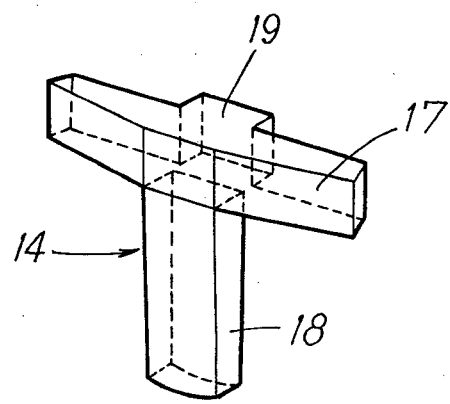
FIG. 8 is a perspective view of a cross-shaped strut.

Each strut 14 (FIG. 8) is cross-shaped, with a horizontal bar 17 extended vertically in the middle by a vertical bar 18 and presenting on its face directed towards the inside of the spiral, a finger 19.

Figure 5:
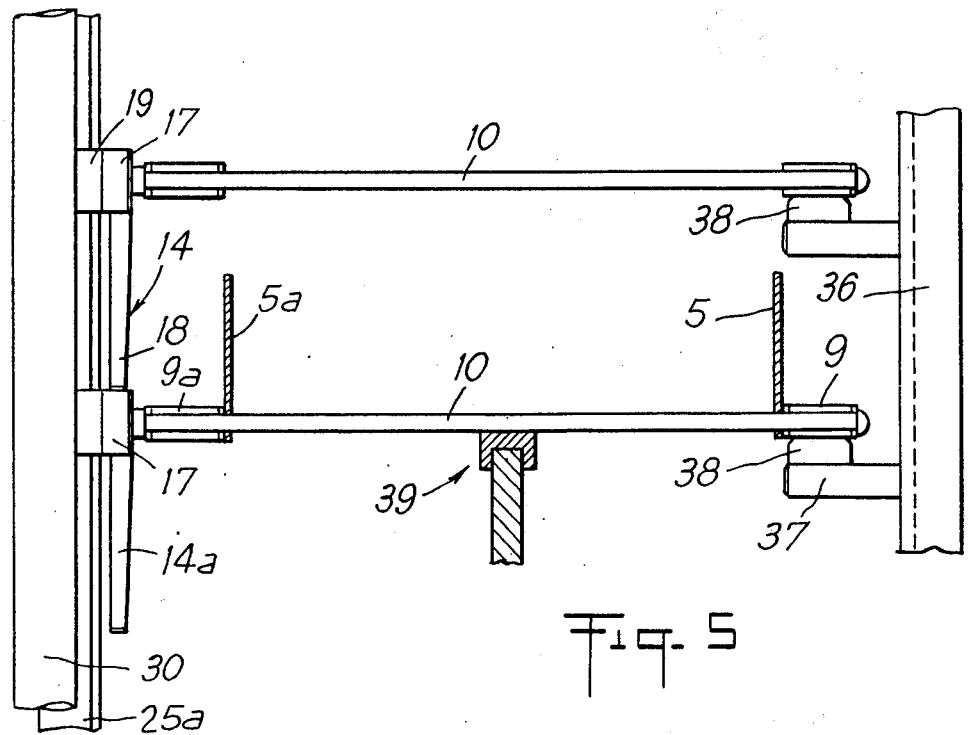
FIG. 5 is an elevational transversal view and cross-section along line V-V of FIG. 4.
Figure 6:
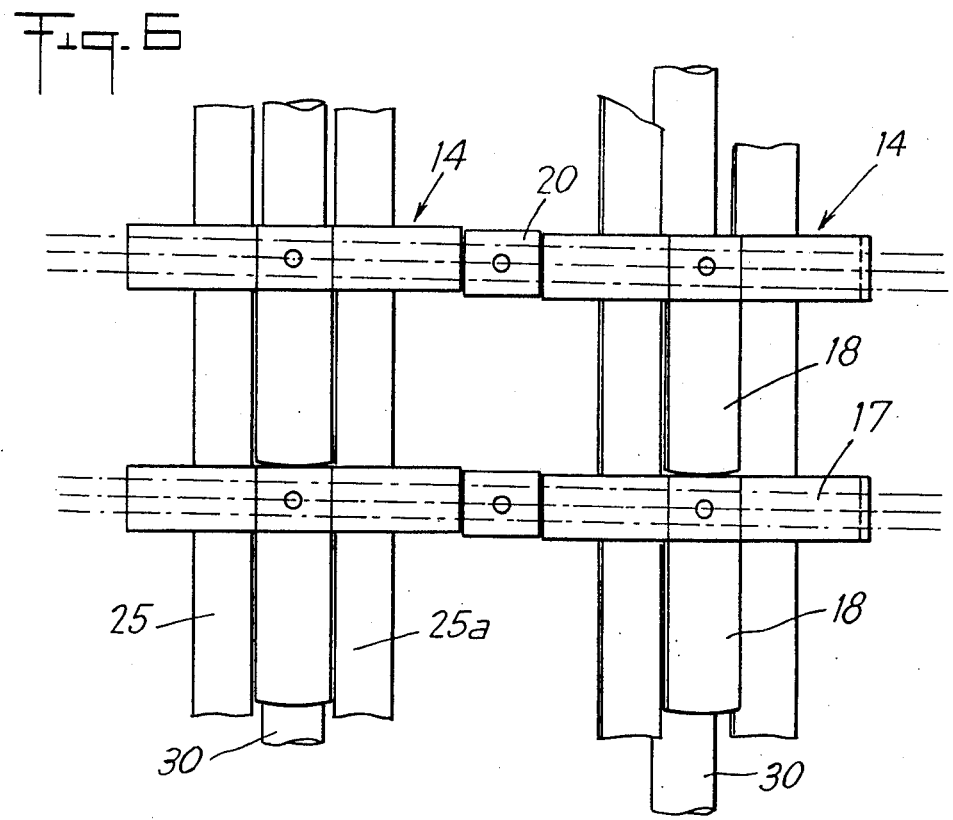
FIG. 6 is an elevational side view showing the struts and the drum.

As shown in FIGS. 5 and 6, the struts 14 are disposed one above the other so that the vertical bar 18 of the strut 14 rests by its lower end on the upper part of the horizontal bar 17 of the strut 14a of the lower spire.

Intermediate elements 20 are provided between the horizontal bars of two adjacent struts, which elements are secured on the inside end of a rod 10 and enable to have a suitable radius of the horizontal bars 17 of the struts. The fingers 19 are selectively engaged in vertical grooves 21 integral with drive means so as to guide the belt 4 along an upward or downward helical course.

Said drive means are constituted by a central drum or capstan 22 (FIG. 2) situated in the central portion left free by the helical piling of the conveyor, the said drum being driven in rotation by a driving member 23 and a transmission member 24.

Figure 2:
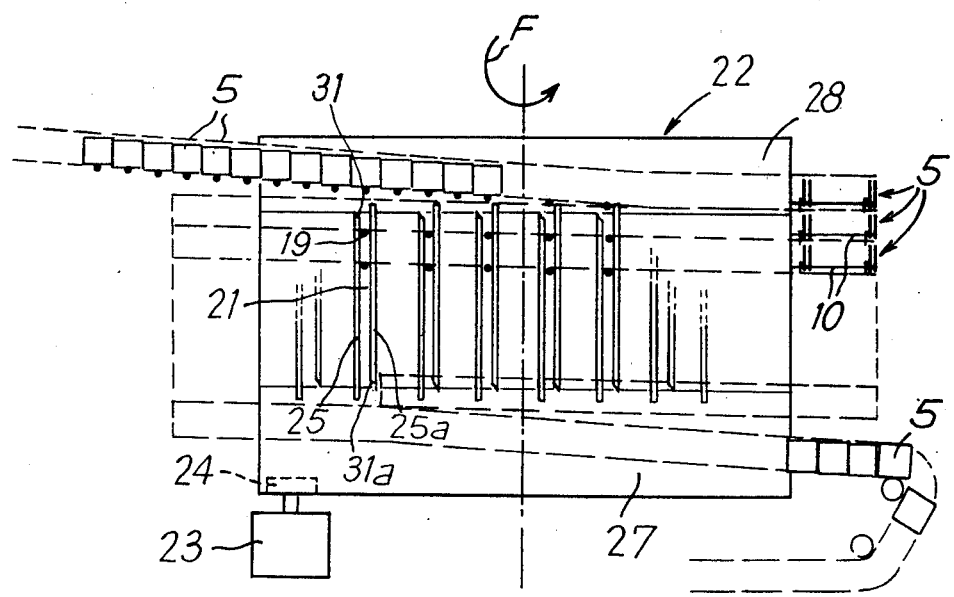
FIG. 2 is an elevational view of the central driving drum or capstan.

The central drum 22 is constituted by lower and upper collars 27, 28 connected together (FIGS. 2,3,4,5 and 6) by T-shaped pieces 25, 25a defining between them the vertical grooves 21 in which the fingers 19 integral with the struts are engaged. The T-shaped pieces 25, 25a are secured by their ends to plates 26 which plates are secured to the lower and upper collars 27, 28 by means of screws 29, 29a. On the plates 26 are also secured vertical guide rods 30 against which abut the ends of the fingers 19 and which define the bottom of grooves 21. As can be seen in FIG. 2, the T-shaped piece 25 is extended at its lower part by a tail-end with inclined face 31 and the T-shaped piece 25a by a tail-end 31a at its upper part. Said tail-ends 31, 31a are designed to facilitate the engagement and release of the fingers 19 into and from the grooves 21, the collars 27 and 28 of the drum being so designed as to cause the prewinding and release of the belt.

The device operates as follows: the drum 22 being driven in rotation according to arrow F, the fingers 19 engage into the grooves 21 at their upper part, said fingers becoming then integral with the drum whilst moving vertically in said grooves 21. When the fingers 19 reach the lower part of the groove 21, they are released therefrom after a helical displacement during which they ensure the driving of the belt with which they are fast.

A supporting member 32 (FIGS. 9, 10, 11, 12) is provided at the lower part and around the drum 22, which member is fixed and rests on the base-plate 1, said member presenting at its upper part a helical path 33 extending over a complete turn at least.

Figure 3:
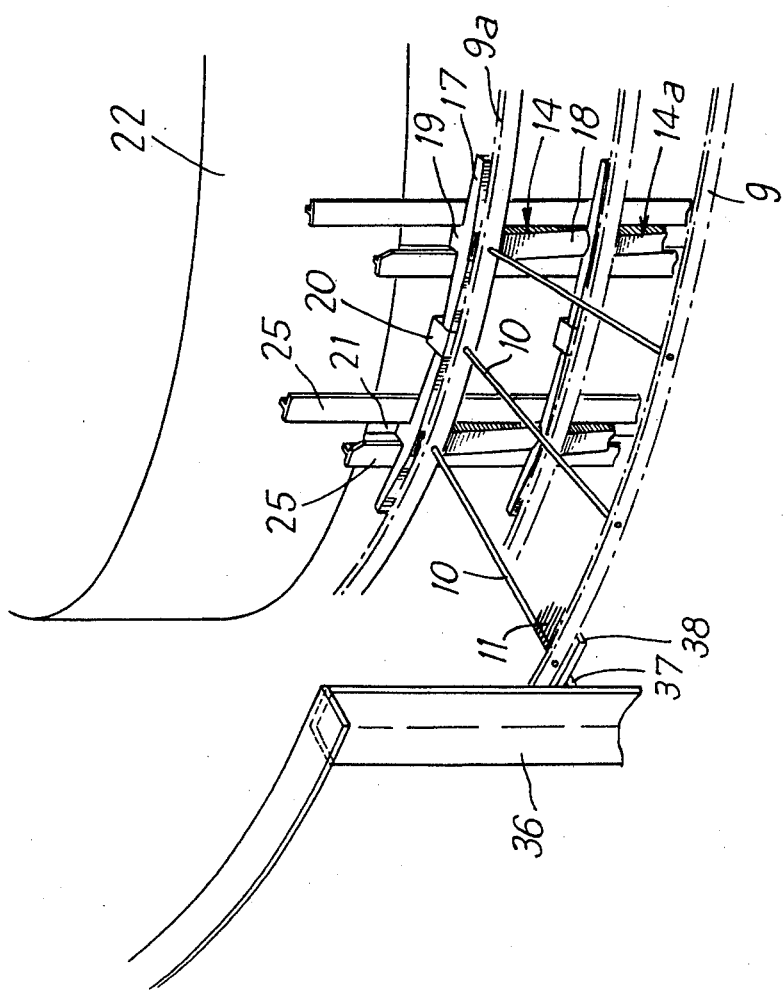
FIG. 3 is a perspective view of the conveyor device.

When the strut 14a reaches the base of the drum 22 (FIGS. 10, 11, 12) its finger 19 escapes the rod 25a which is interrupted in 34 to allow finger 19 to pass. At that moment the horizontal bar 17 and finger 19 come to rest on the helical face 33 of the supporting member 32 and the said strut 14a follows the helical path 33 over a guided turn, this as far as the leaving point 33a where it occupies the position 14b and wherefrom the belt is guided by other known means not shown in the drawing.

Where the belt arrives on to the drum 22 (FIG. 9) there is provided at the upper part of said drum and around it, a fixed supporting member 35 presenting a helical path which is the reverse of the outgoing path 33, said supporting member being mounted on a fixed external chassis 36 (FIG. 3). The supporting member 35 is designed to bring the struts 14 opposite the rods 25, 25a for the engagement of the finger 19 into the groove 21. Said fixed external chassis 36 comprises support members 37 arranged in helical manner and on which is fixed a helical strip 38 supporting the chain 9 situated on the outside of the belt 4. Said belt is thus guided on the inside by the struts 14 which cooperate with the drum 22 and on the outside by the helical strip 38 on which moves the chain 9.

With very wide belts, extra supports should be provided, constituted for example by a central rail 39 against which the belt 4 can rest.

Figure 15:
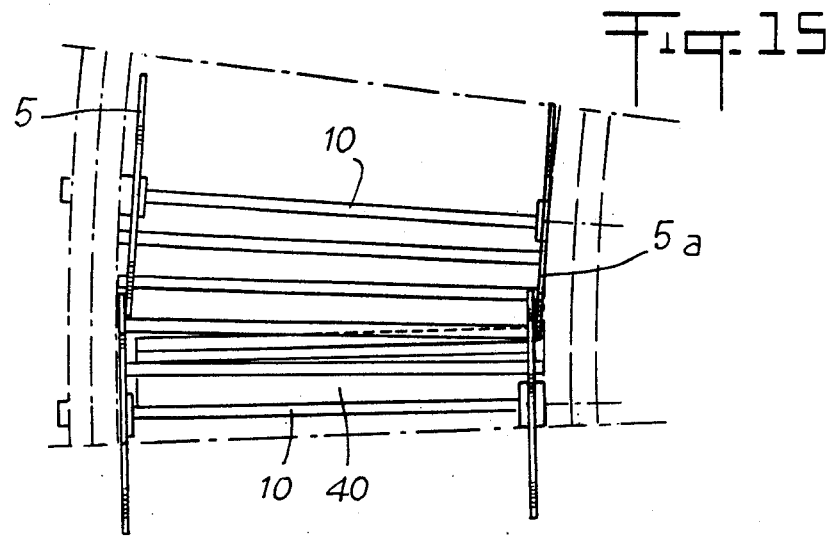
FIG. 15 is a plan view of the slat conveyor.
Figure 14:
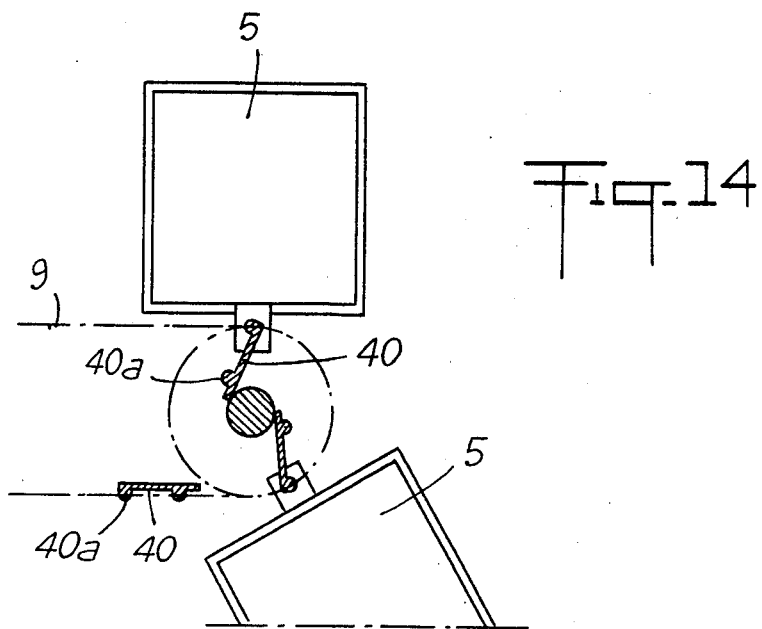
FIG. 14 is an elevational view of the conveyor equipped with slats for driving the immersed products.

FIGS. 14 and 15 show the conveyor belt 4 equipped with slats of plastic material 40 hingedly mounted under its lower face at a distance one from the other, the whole forming a belt with ribs 40a. Each slat 40 is mounted on a rod 10 of the belt 4.

This device operates as follows:

At the level of the first spire $S_1$ of the belt 4, (FIG. 16), the products or elements designed to undergo a refrigeration in brine rest on the upper part of the belt 4, whereas the belt comprises at its lower part slats 40 extending vertically under the belt. The belt of the second spire and the edge elements define an inclined channel which is filled with a cooling liquid, such as brine 42, for refrigerating products or elements 41. The level of the brine varies due to the inclination of the spire from the level N0 to the level N4, so that, when a product 41 reaches the second spire $S_2$, said product passes from the position at the level N1 where it starts to be immersed to the positions N2 and N3 where it floats on the brine 42 due to the fact that it is subjected to the Archimedes' force along arrow 43. When it reaches level N3, and considering the height H of the slat above the top surface of the belt of the spire $S_2$, the product 41 resting against one of the slats 40 is carried away by it. Thereafter, said product 41 sets itself in the cooling liquid or brine at the maximum level N4 and remains completely immersed in that position in the spire $S_2$ where it is submerged and subjected to Archimedes' force. At the end of the course, the slats 40 are folded to a horizontal position by means of a plate 44 by an inclined end 44a thereof, so that after the retraction of the slats, the products or elements 41 are removed by buoyancy towards the surface of the bath of cooling liquid or brine.

The invention is in no way limited to the embodiment given hereinabove and on the contrary covers any modifications that can be brought thereto without departing from the scope thereof.

What is claimed is:

1. A helically guided endless belt conveyor including in combination, a conveyor belt having a helical portion made up of a number of spires, a plurality of T-shaped struts adjacent to the inner edge of said belt portion, each of said struts comprising a vertical bar, the lower end of which engages the upper end of a strut of the next spire below to determine the spire pitch, a helical guide means, members adjacent to the outer edge of said belt resting on said helical guide means, a central driving drum disposed within said helical portion, and a plurality of vertical grooves in said drum, each of said struts comprising a crossbar having an inwardly extending finger to provide a plurality of fingers for selectively engaging in said grooves.

2. Conveyor as claimed in claim 1, wherein two collars, an upper collar and a lower collar, joined together by T-shaped pieces defining said vertical grooves and vertical guide rods defining the bottom of said grooves, one of said T-shaped pieces being extended vertically, one downwards and the other upwards, and said collars presenting smooth walls for the pre-winding and release of said belt.

3. Conveyor as claimed in claim 1 or 2, including fixed helical guide members supporting the struts are provided around the lower and upper parts of the drum to ensure the engagement and release of the fingers of the struts.

4. Conveyor as claimed in claim 1, constituted by two chains joined together by rods on which is fixed a belt or strip with articulated links, wherein said cross-shaped struts are secured on one end of the rods.

5. Conveyor as claimed in claim 1 or 4, wherein on each side of the belt are mounted, in overlapping manner, edge elements which comprise lugs with oblong holes in which are engaged the ends of the rods connecting the chains.

6. Conveyor as claimed in claim 4, wherein a central rail is provided under the belt, so that said belt can rest against it.

7. Conveyor as claimed in claim 1, including belt edge elements constituted by solid plates.

8. Conveyor as claimed in claim 1, including belt edge elements constituted by latticed plates.

9. Conveyor as claimed in claim 1, wherein said belt is extended outside the spires to form a loop which is mounted over at least three pinions or drums guiding the chains, which pinions or drums are mounted for free rotation on axes integral with the support frame.

10. Conveyor as claimed in claim 1, wherein slats of elastic material are hingedly mounted under the lower face of the belt, at a distance one from the other.

* * * * *

UNITED STATES PATENT AND TRADEMARK OFFICE
CERTIFICATE OF CORRECTION

PATENT NO. : 4,450,953
DATED : May 29, 1984
INVENTOR(S) : Robert Le Cann and Jean-Paul Fache It is certified that error appears in the above-identified patent and that said Letters Patent are hereby corrected as shown below:

Column 4, line 31, after "wherein" insert

-- said drum comprises --.

Signed and Sealed this

Twenty-third Day of October 1984

[SEAL]

Attest:

Attesting Officer

GERALD J. MOSSINGHOFF
Commissioner of Patents and Trademarks